UNITED STATES PATENT OFFICE 2,284,700

SOYA BEAN PRODUCT

Eric Wahlforss, Chicago, Ill., assignor to The Glidden Company, Cleveland, Ohio, a corporation of Ohio No Drawing. Application August 6, 1936, Serial No. 94,573

14 Claims. (Cl. 106—154)

This invention relates to soya beans, and has particular reference to the production of edible and technical products of considerable importance therefrom. More particularly, it contemplates the production of these new products by separating the oil from the meal, thereafter dissolving the alkali soluble protein, precipitating it onto the alkali insoluble portions, and separating the precipitate from the soluble portions.

The soya bean has been used from the dawn of history in the Orient, both for its food value and for technical purposes. It has recently been introduced into the western countries, and considerable strides have been made in soya bean technology. The oil is generally separated from the bean, to be used for edible and technical purposes, leaving behind a meal with a very high protein content, about 45%. This meal has been the subject of considerable research. Valuable adhesives have been made from it; and the alkali soluble proteins have been isolated from the other constituents of the meal, to produce a protein with rather remarkable properties, the protein serving as a binder for water paints, etc. The protein has likewise been denatured, to make it permanently soluble, Cone and Brown U. S. Patent 1,955,375 of April 17, 1934. This denaturing is brought about by treating the soya bean cake with a strong alkali solution of alkali or alkaline earth hydroxides at either normal water temperatures or at an elevated temperature, for example, 100 parts of ground seed press cake are treated with 2,000 parts of water and 10 parts of caustic soda at a temperature of 60° F. for 24 hours. This type of protein makes an excellent paper coating.

It has also been proposed, Lampe U. S. Patent 980,292, Jan. 3, 1911, to separate the carbohydrates from the soya beans by washing a pulp of whole soya beans, less the hulls, with dilute sodium bicarbonate solution, to obtain a fatty diabetic food.

In working with the application of the Cone and Brown process to soya bean protein, I have discovered that edible products can be obtained which are considerably superior to the product of Lampe, when used as diabetic and health foods, and that these edible products likewise have valuable technical properties.

Soya bean meal contains a relatively small percentage of oil, celluloses and various hemicelluloses from the hulls and cell-walls, certain water soluble carbohydrates, and proteins. A typical solvent extracted meal will contain under 1% of oil, about 7% of cellulose fiber, about 22% of soluble carbohydrates, about 44% of protein and the balance moisture. An expelled or hydraulically pressed meal will contain more oil, up to 5 to 6%, the other constituents being present in the same ratio to each other but in slightly lower quantity.

The proteins of the soya meal fall into three classes. The water soluble albumins are present in rather small quantity; the dilute alkali soluble globulins, largely glycinin, represent the bulk of the protein, while the relatively insoluble complex prolamines are present in quantities somewhat higher than the albumens. All of these proteins are valuable foods, the albumens being most readily digestible, the prolamines least readily. The globulins are the desirable proteins for technical purposes; and prior attempts to isolate the protein have separated the globulins from the remaining meal constituents, insofar as the separation is technically possible.

The separation of the globulins from the remaining meal constituents has generally been effected by leaching the meal with a weak alkali, which dissolves everything but the prolamines and the cellulose. The dispersion is separated from the insoluble, and the globulins precipitated from the solution, the albumins and carbohydrates remaining in solution. The protein while in solution may be denatured before and/or after separation from the insolubles or precipitation, as taught by the Cone and Brown Patent 1,955,375. Somewhat better results may be obtained if the bean meal is treated with a solution of weak acid at 4.6–4.7 pH (the isoelectric point of the soya bean globulin), whereby a preliminary separation of the bulk of the water solubles is effected.

While a good grade of vegetable protein can be made by the above methods, the yields are rather small. A solvent extracted meal will give a yield of up to 40% of finished protein, all conditions being right, although yields are ordinarily somewhat lower. The residue, comprising the cellulose and prolamines, is of lesser value from either a technical or edible viewpoint.

I have discovered that if the protein be digested in the presence of the insoluble residue, and preferably denatured, and then precipitated onto the residue as a core, the yields of protein material are, of course, substantially increased, yields of over 60% being obtainable. The protein material produced, while not as good technically as the isolated globulins obtained by prior art methods, is considerably better in its properties than a blend of the isolated proteins with an equivalent amount of inert material, or with the same residue after drying. The precipitation of the protein onto the residue, moreover, yields certain advantages over the prior art methods. The settling, filtration and drying of the precipitated protein are facilitated; and the dried protein obtained wets more easily than the isolated protein of the prior art.

If the protein is to be used for edible purposes, as for diabetic foods, certain desirable results are obtained, as compared with prior art methods. Where a mere alkali extraction is made, without denaturing, the principal advantage is substantially complete removable of soluble carbohydrates, which is impossible of attainment by mere washing; by dissolving the protein, the protective action of the protein on part of the soluble carbohydrates is entirely overcome. The traces of residual soluble carbohydrate, while highly objectionable from a technical viewpoint, may be disregarded from an edible viewpoint. A second advantage is the distribution of traces of salt, occluded in the precipitate; from the point of view of flavor, a distribution is obtained which can hardly be duplicated by later additions. This distribution is of particular benefit when hydrochloric acid is used as the precipitant, sodium chloride resulting. A third advantage is the readier solubility of this precipitated protein, resulting in quicker assimilation in the body.

When the protein is denatured, either with caustic soda alone, or preferably in mixture with lime, certain other desirable results are obtained. The denaturing of the protein reduces the complexity of its structure somewhat, so that there is less work in digesting the protein, and the lime used and occluded produces a desirable content of calcareous ash which is readily assimilated by the body.

The prior art isolated proteins have some of the edible advantages of my product, but are of course a great deal more expensive, and lack, in addition, the bulking value of the cellulose and hemicelluloses in the diet. These act like bran in the common cereals, and are of considerable value, both in adding bulk and in adding flavor to the product.

As a typical example of my invention; I took 100 pounds of solvent extracted soya bean meal, containing 0.5% oil, 7% fiber, 22% carbohydrates, 45% protein and 10% moisture. To this meal, in a tank, I added 1500 pounds of water and 12 pounds of 10% sulfuric acid; the mass was mixed for 2 hours, the pH being 4.6 at that time. The residue was separated from the solution, which contained a large portion of the carbohydrates and albumins. The residue in the tank was then agitated with a solution of 3 pounds caustic soda for 1 hour, when 3 pounds of lime were added, stirring being continued. The entire mass was kept at room temperature, about 70° F., for 15 hours. At this time, the insolubles which had settled were stirred up again, and about 30 pounds of sulfuric acid were added, to a pH of 4.7. The protein precipitated onto the particles of insoluble residue; settling was rapid, about ½ hour. The clear solution was decanted from the slurry, which was washed, filtered and dried. The yield, based on dry weight as compared to original dry weight, was 66 pounds.

A similar batch was run in which the insolubles were removed during the course of the denaturing. On precipitation, settling was somewhat slower, but separation was much more difficult, the precipitate being of a softer, bulkier nature than in my process. Drying of the wet curd was likewise considerably more difficult, the rather fibrous nature of my product permitting more rapid removal of water. The yield was only 35 pounds, as compared to 66 pounds by my process.

The proteins were tested in adhesives, paper coatings and water paints. The mixed protein, made by my new process, in every case gave results poorer than the isolated protein, but considerably better than the isolated protein mixed with corresponding amounts of inerts, or ground grits obtained from separated insolubles.

Similar duplicate runs were made, eliminating the preliminary acid wash in some cases, the denaturing in others, and the lime in still others, but in every case dissolving the protein, and comparing the product obtained by removing the alkali insoluble residue before precipitation with the protein precipitated onto the residue as a base. Results invariably were poorer for the residual base protein compared with the pure protein, but better when compared with the protein after dilution.

From an edible point of view, I find that sulfuric acid should not be used to precipitate, because of the bitter taste it imparts. The lime denatured products likewise have a slightly astringent or bitter taste.

While I have shown only an alkali extraction of the meal, it should be understood that the alkali soluble portions of the protein, the globulins, are likewise soluble although to a somewhat lesser degree, in neutral salt solutions, and even in water, when the solvent power of the salts present in the meal is made use of, and such solutions may be used to dissolve the protein. In such case, the protein must be precipitated with compounds which will bring the pH to the isoelectric point, using alkalies where an acid solution has been made.

I claim:

1. The method of preparing a composite soya bean product which comprises leaching soya bean meal containing water soluble proteins, water soluble carbohydrates, alkali soluble globulin proteins, hemi cellulose, cellulose and insoluble prolamine proteins with a weak acid at a pH corresponding to the isoelectric point of the alkali soluble globulin proteins in the meal, dissolving the alkali soluble proteins from the meal, precipitating the alkali soluble proteins in the presence of the insoluble residue comprising cellulose, hemicellulose and alkali insouluble prolamines originally present in the meal, separating the composite of insoluble residue and precipitated protein from the solution, and drying the composite thus formed.

2. The method of preparing a composite soya bean product which comprises leaching soya bean meal containing water soluble proteins, water soluble carbohydrates, alkali soluble globulin proteins, hemi celluloses, cellulose and insoluble prolamine proteins with a weak acid at a pH corresponding to the isoelectric point of the alkali soluble globulin proteins in the meal, dissolving the alkali soluble globulin proteins from the meal, denaturing the globulin proteins in the presence of the insoluble residue originally present in the meal, precipitating the alkali soluble proteins in the presence of the insoluble residue comprising cellulose, hemicelluloses and alkali insoluble prolamines originally present in the meal, separating the composite of insoluble residue and precipitated protein from the solution, and drying the composite thus formed.

3. The method of preparing a composite soya bean product which comprises leaching soya bean meal containing water soluble proteins, water soluble carbohydrates, alkali soluble globulin proteins, hemi celluloses, cellulose and alkali insoluble prolamine proteins with a weak acid at a pH corresponding to the isoelectric point of the alkali soluble globulin proteins in the meal, dissolving the alkali soluble proteins from the meal in an alkaline solution, precipitating the alkali soluble proteins in the presence of the insoluble residue comprising the cellulose hemicelluloses and alkali insoluble prolamine proteins originally present in the meal, separating the composite of insoluble residue and precipitated protein from the solution, and drying the composite thus formed.

4. The method of preparing a composite soya bean product which comprises dissolving alkali soluble globulin proteins from soybean meal, digesting the solution of globulin protein with the insoluble residue comprising cellulose, hemicellulose, and alkali insoluble prolamine protein, thereafter precipitating the alkali soluble globulins from the solution while in admixture with the insoluble residue, and recovering the thus formed composite.

5. The method of preparing a composite soya bean product which comprises dissolving alkali soluble globulin proteins from soybean meal by means of an alkaline solution, digesting the solutions of globulin protein with the insoluble residue comprising cellulose, hemicellulose and alkali insoluble prolamine protein, thereafter precipitating the alkali soluble globulins from the solution while in admixture with the insoluble residue, and recovering the thus formed composite.

6. The method of preparing a composite soya bean product which comprises dissolving alkali soluble globulin proteins from soybean meal, digesting a caustic soda solution of the dissolved globulin protein with the insoluble residue comprising cellulose, hemicellulose and alkali insoluble prolamine protein, thereafter precipitating the alkali soluble globulins from the solution while in admixture with the insoluble residue, and recovering the thus formed composite.

7. The method of preparing a composite soya beans product which comprises dissolving alkali soluble globulin proteins from soya bean meal, digesting a caustic soda and lime solution of said dissolved globulin proteins with the insoluble residue comprising cellulose, hemicellulose, and alkali insoluble prolamine protein, thereafter precipitating the alkali soluble globulins from the solution while in admixture with the insoluble residue and recovering the thus formed composite.

8. The method of preparing a composite soya bean product which comprises dissolving alkali soluble globulin proteins from soya bean meal by means of a caustic alkali solution, adding lime to the solution of dissolved globulin proteins, digesting the caustic lime solution of the dissolved globulin protein with the insoluble residue comprising cellulose, hemicellulose, and alkali insoluble prolamine protein, thereafter precipitating the alkali soluble globulins from the solution while in admixture with the insoluble residue and recovering the thus formed composite.

9. The method of preparing a composite soya bean product which comprises digesting a solution of the alkali soluble globulin proteins present in soya bean meal with the insoluble residue of soya bean meal consisting essentially of cellulose, hemicellulose, and alkali insoluble prolamine protein, thereafter precipitating the alkali soluble globulins from the solution while in admixture with the insoluble residue and recovering the thus formed composite.

10. A soya bean protein composition suitable for adhesive use consisting essentially of a composite of isolated soya bean globulin protein and the insoluble residue of cellulose, hemicellulose and alkali insoluble prolamines present in soya beans, said composite resulting from digesting a solution of soya bean globulin proteins in admixture with said insoluble residue, and thereafter precipitating the globulins from solution while in admixture with the insoluble residue.

11. A soya bean protein composition suitable for adhesive use consisting essentially of a composite of isolated soya bean globulin protein and the insoluble residue of cellulose, hemicellulose and alkali insoluble prolamines present in soya beans, said composite resulting from digesting an alkaline solution of soya bean globulin proteins in admixture with said insoluble residue, and thereafter precipitating the globulins from solution while in admixture with the insoluble residue.

12. A soya bean protein composition suitable for adhesive use consisting essentially of a composite of isolated soya bean globulin protein and the insoluble residue of cellulose, hemicellulose and alkali insoluble prolamines present in soya beans, said composite resulting from digesting a caustic soda solution of soya bean globulin proteins in admixture with said insoluble residue and thereafter precipitating the globulins from solution while in admixture with the insoluble residue.

13. A soya bean protein composition suitable for adhesive use consisting essentially of a composite of isolated soya bean globulin protein and the insoluble residue of cellulose, hemicellulose and alkali insoluble prolamines present in soy beans, said composite resulting from digesting a caustic soda and lime solution of soy bean globulin proteins in admixture with said insoluble residue and thereafter precipitating the globulins from the solution while in admixture with the insoluble residue.

14. The method of making a glue base, which comprises soaking material very rich in hemicellulose in a solution of a precipitable protein and precipitating said protein in said material.

ERIC WAHLFORSS.